(12) United States Patent
Ott et al.

(10) Patent No.: US 7,951,312 B2
(45) Date of Patent: May 31, 2011

(54) BOROSILICATE GLASS WITH UV-BLOCKING PROPERTIES FOR PHARMACEUTICAL PACKAGING

(75) Inventors: Franz Ott, Konnersreuth (DE); Joerg Hinrich Fechner, Weiden (DE); Max Raster, Budenheim (DE); Reinhard Maennl, Mitterteich (DE)

(73) Assignee: Schott AG, Mainz (DE)

( * ) Notice: Subject to any disclaimer, the term of this patent is extended or adjusted under 35 U.S.C. 154(b) by 48 days.

(21) Appl. No.: 12/431,832

(22) Filed: Apr. 29, 2009

(65) Prior Publication Data

US 2009/0315002 A1 Dec. 24, 2009

(30) Foreign Application Priority Data

Apr. 30, 2008 (DE) .................. 10 2008 001 496

(51) Int. Cl.
*F21V 9/06* (2006.01)
*C03C 3/078* (2006.01)
*C03C 3/083* (2006.01)

(52) U.S. Cl. .............. 252/588; 501/58; 501/59; 501/65; 501/66; 501/72; 501/67; 501/68; 501/69; 501/70

(58) Field of Classification Search .................. 252/588, 252/520.22, 519.12, 520.21; 501/58, 59, 501/65, 66, 67, 68, 69, 70, 72

See application file for complete search history.

(56) References Cited

U.S. PATENT DOCUMENTS

| | | | |
|---|---|---|---|
| 4,565,791 A | 1/1986 | Boudot et al. | |
| 5,064,461 A | 11/1991 | Morena et al. | |
| 5,219,801 A | 6/1993 | Shorrock et al. | |
| 5,447,891 A | 9/1995 | Spinosa et al. | |
| 5,459,110 A | 10/1995 | Brix | |
| 5,610,108 A * | 3/1997 | Watzke et al. ................. | 501/59 |
| 5,612,262 A | 3/1997 | Kloss et al. | |
| 5,747,399 A | 5/1998 | Kosokabe et al. | |
| 6,204,212 B1 | 3/2001 | Kunert et al. | |
| 6,635,592 B1 | 10/2003 | Kosokabe et al. | |
| 6,851,280 B2 * | 2/2005 | Ott et al. ........................ | 65/25.1 |
| 7,375,043 B2 | 5/2008 | Fechner et al. | |
| 7,491,668 B2 | 2/2009 | Fechner et al. | |
| 7,700,506 B2 | 4/2010 | Fechner et al. | |
| 2001/0055930 A1 * | 12/2001 | Ott et al. ........................ | 445/9 |
| 2003/0087745 A1 | 5/2003 | Peuchert et al. | |
| 2003/0184211 A1 * | 10/2003 | Hueber et al. ................. | 313/480 |
| 2003/0232169 A1 | 12/2003 | Kawai | |
| 2004/0176237 A1 | 9/2004 | Ott et al. | |
| 2004/0239253 A1 * | 12/2004 | Walser et al. .................. | 313/618 |
| 2004/0266603 A1 * | 12/2004 | Fechner et al. ................. | 501/66 |
| 2005/0037911 A1 * | 2/2005 | Fechner et al. ................. | 501/66 |
| 2005/0151116 A1 * | 7/2005 | Fechner et al. ............. | 252/186.1 |
| 2006/0006786 A1 * | 1/2006 | Fechner et al. ................. | 313/493 |
| 2006/0009343 A1 * | 1/2006 | Fechner et al. ................. | 501/65 |
| 2006/0010917 A1 * | 1/2006 | Fechner et al. ................. | 65/101 |
| 2006/0120105 A1 * | 6/2006 | Fechner et al. ................ | 362/607 |
| 2006/0205583 A1 * | 9/2006 | Naumann et al. ................ | 501/66 |
| 2006/0264313 A1 * | 11/2006 | Fechner et al. ................. | 501/62 |
| 2008/0254301 A1 | 10/2008 | Fechner et al. | |
| 2008/0259602 A1 * | 10/2008 | Fechner et al. ................ | 362/247 |
| 2010/0045164 A1 * | 2/2010 | Fechner et al. ................ | 313/493 |
| 2010/0108914 A1 * | 5/2010 | Fechner et al. ............. | 250/492.1 |

FOREIGN PATENT DOCUMENTS

| | | |
|---|---|---|
| DE | 198 42 942 | 4/2000 |
| DE | 100 25 465 | 8/2002 |
| DE | 10 2004 027 119 | 12/2004 |
| DE | 10 2004 027 120 | 12/2004 |
| JP | 8-12369 | 1/1996 |
| JP | 2002-293571 | 10/2002 |

OTHER PUBLICATIONS

Technology of Glass, Edited by Northwest Institute of Light Industry, Published by China Light Industry Press, Jan. 1982, p. 504 (With Certified English Translation).

* cited by examiner

*Primary Examiner* — Douglas McGinty

(74) *Attorney, Agent, or Firm* — Michael J. Striker

(57) ABSTRACT

The borosilicate glass for pharmaceutical packaging has a transmission τ in the visible range of more than 80% at a wavelength of 400 nm, a transmission τ in the UV range of at most 0.1% at wavelengths under 260 nm (each at a sample thickness of 1 mm), a transformation temperature Tg of 550° C. to 590° C. and a processing temperature $V_A$ of 1100° C. to 1200° C. The glass has a composition, in wt. % on an oxide basis, of $SiO_2$, 60-80; $B_2O_3$, 5-15; $Al_2O_3$, 2-10; $TiO_2$, 0.5-7; Σ $Li_2O+K_2O+Na_2O$, 3-10; Σ alkaline earth oxides, 0.5-10; $ZrO_2$, 0-3; and $Fe_2O_3$, 0-0.2. The glass is suitable for packaging UV-sensitive substances but nevertheless permits optical quality control.

12 Claims, No Drawings

BOROSILICATE GLASS WITH UV-BLOCKING PROPERTIES FOR PHARMACEUTICAL PACKAGING

CROSS-REFERENCE

The invention claimed and described herein below is also described in German Patent Application DE 10 2008 001 496.6 filed on Apr. 30, 2008 in Germany. The aforesaid German Patent Application provides the basis for a claim of priority of invention for the invention claimed herein below under 35 U.S.C. 119 (a) to (d).

BACKGROUND OF THE INVENTION

1. The Field of the Invention

The subject matter of the present invention is a borosilicate glass with UV-blocking properties for pharmaceutical applications.

2. The Related Art

On account of its good chemical resistance borosilicate glass belongs to the preferred packing materials for pharmaceutical preparations with demanding packaging requirements. Light sensitive, i.e. UV-sensitive, substances are currently packaged in containers made from brown glass, in which the brown color is produced by considerably amounts of iron compounds.

However these strongly colored glasses are only suitable to a limited extent for the optical production control systems increasingly employed by the pharmaceutical industry.

SUMMARY OF THE INVENTION

It is an object of the present invention to provide a colorless physiologically unobjectionable glass, which has the highest water resistance class, a light transmission (at 400 nm) of more than 80 percent in the visible range and a transmission of under 0.1 percent in the UV range at wavelengths under 260 nm.

It is another object of the present invention to provide a glass and/or glass tubing, which is processed in the conventional automated ampoules or bottle-making apparatus and also has a glass transition temperature Tg of about 550° C. to 580° C. and a processing temperature of about 1100 to 1200° C. at a viscosity of $10^4$ dPa s.

The borosilicate glass with UV-blocking properties for pharmaceutical packaging according to the invention has a content, in wt. % on the basis of oxide content, of:

| | |
|---|---|
| $SiO_2$ | 60-80 |
| $B_2O_3$ | 5-15 |
| $Al_2O_3$ | 2-10 |
| $TiO_2$ | 0.5-7 |
| $\Sigma\ Li_2O + K_2O + Na_2O$ | 3-10 |
| $\Sigma$ alkaline earth oxides | 0.5-10 |
| $ZrO_2$ | 0-3 |
| $Fe_2O_3$ | 0-0.2; and | a glass transition temperature Tg of 550° C. to 590° C. and a processing temperature $V_A$ of 1100° C. to 1200° C. at a viscosity of $10^4$ dPa s, a transmission $\pi$ of at least 80% at a wavelength of 400 nm, and a transmission $\pi$ of less than 0.1% at a wavelength of under 260 nm, each transmission being the transmission of a sample with a thickness of 1 mm.

The orosilicate glass may also contain up to 1 wt. % of F in order to improve the viscosity behavior and is made by melting under oxidizing conditions The $TiO_2$ content is responsible for the UV-blocking. In preferred embodiments of the invention the preferred $TiO_2$ content is from 0.5 to 5.5 wt. %, but a content of from 1 to 3 wt. % of $TiO_2$ is especially preferred.

Furthermore it is preferred when at least 80%, preferably at least 95%, especially at least 99%, of the titanium dioxide content is in the +4 oxidation state. This may be achieved by oxidative melting, i.e. melting the glass batch under oxidizing conditions. Oxidative conditions during the melting can be achieved in a known way by addition of nitrates, especially of alkali nitrates, by blowing oxygen and/or dry air into the melt, or by an oxidizing burner adjustment, e.g. during melting of the glass.

Furthermore it has been shown that a possible tinting of the glass due to the $TiO_2$ content can be reduced when chloride and/or $Sb_2O_3$ are avoided during refining. In so far as the glass contains $Fe_2O_3$, sulfate refining is preferably avoided, since the presence of sulfur-containing compounds together with iron compounds easily leads to a brown coloration. Preferably no refining agents are included in the glass and the refining is conducted e.g. by applying a low pressure, or with $As_2O_3$ and/or $Sb_2O_3$.

A reduced iron content of up to 0.2 wt. % in connection with the $TiO_2$ content has a synergistic effect in regard to a good UV blocking. However since the danger of forming an intensely brown colored Ti/Fe complex exists, especially during extended thermal treatment of the glass, an iron content of at most 1500 ppm of $Fe_2O_3$ is preferred. For development of the synergistic effect the iron content is preferably at least 50 ppm. A $Fe_2O_3$ content of 150 to 500 ppm is preferred.

In the embodiments, in which $Fe_2O_3$ is present, it has been shown that a minimum content of $TiO_2$ of 0.5 wt. % and especially 0.7 and/or 0.8 wt. %, is sufficient. The upper limit for the $TiO_2$ content in the presence of $Fe_2O_3$ amounts to 4.5 wt. %, especially 4 wt. %, wherein 3.5 wt. % is particularly preferred. In many situations an upper limit of 3 wt. %, especially of 2.8 wt. % and even 2.5 wt. % has proven to be completely sufficient.

The molar ratio of $Fe_2O_3$ to titanium should preferably be greater than 1:6, especially greater than 1:22.

The borosilicate glass according to the invention can contain preferably from 0 to 3 wt. % $ZrO_2$, from 0 to 3 wt. % $WO_3$, from 0 to 3 wt % of $Bi_2O_3$ and from 0 to 3 wt. % of $MoO_3$. However the amounts of the more strongly colored oxides, $WO_3$ and $MoO_3$, are preferably kept less than 1 wt. %.

In preferred embodiments of the invention the borosilicate glass, for example, has a composition of, in wt. % on an oxide basis, of $SiO_2$, 69-77; $B_2O_3$, 10-12; $Al_2O_3$, 3.5-6; $TiO_2$, 0.1-7; $Na_2O$, 6-8; CaO, 1-2.5; $Fe_2O_3$, 0-0.2; $ZrO_2$, 0-1 and F, 0-1.

In further preferred embodiments of the invention the borosilicate glass, for example, has a composition of, in wt. % on an oxide basis, of $SiO_2$, 67-75; $B_2O_3$, 6-10; $Al_2O_3$, 3-7; $TiO_2$, 0.1-7; $Na_2O$, 5.5-8; CaO, 0.5-2; BaO, 1-3; $Fe_2O_3$, 0-0.2; $ZrO_2$, 0-1; and F, 0-1. The preferred amount ranges for $TiO_2$ and $Fe_2O_3$ correspond to the above-described amount ranges for these oxides.

The UV blocking obtained with these glasses is outstanding. The UV blocking at wavelengths under 260 nm is certainly fulfilled in all embodiments. Of course it is preferred that the glass can also block light in the long-wave UV range. As the examples show, it is also possible without difficulty to achieve UV blocking up to a wavelength of about 350 nm with iron-free glass compositions, and a transmission of 0.1% with a glass thickness of 1 mm.

EXAMPLE

To make examples of the borosilicate glass according to the invention a uniformly mixed glass batch of the usual raw materials was melted, refined and homogenized in a quartz glass crucible at 1600° C. Subsequently the glass melt was cast or poured and cooled with a cooling speed of 20 K/h. The following Table I shows the composition, in wt. % on an oxide basis, and essential properties of the borosilicate glass according to the present invention.

The following properties are reported in the Table:
glass transition temperature Tg [° C.]
processing temperature $V_A$ [° C. at $10^4$ dPa s]
UV blocking by reporting the highest wavelength at which the transmission π amounts to a maximum of 0.1% with a sample thickness of 1 mm
transmission π at a wavelength of 400 nm at a sample thickness of 1 mm.

TABLE I

BOROSILICATE GLASS COMPOSITIONS OF THE INVENTION AND THEIR PROPERTIES (OXIDE INGREDIENT AMOUNTS IN WT. %)

| | | | EXAMPLE | | | | | | |
|---|---|---|---|---|---|---|---|---|---|
| | Comp. Ex. 1 | Comp. Ex. 2 | 1 | 2 | 3 | 4 | 5 | 6 | 7 |
| $SiO_2$ | 74.5 | 68.85 | 74 | 73.7 | 70.5 | 69 | 74.15 | 72.65 | 70.65 |
| $B_2O_3$ | 11.1 | 8.2 | 11.1 | 11 | 11.1 | 11.1 | 8.2 | 8.2 | 8.2 |
| $Al_2O_3$ | 5.4 | 5.6 | 5.4 | 5.1 | 5.4 | 5.4 | 5.6 | 5.6 | 5.6 |
| $Na_2O$ | 7.3 | 6.5 | 7.3 | 7 | 7.3 | 7.3 | 6.5 | 6.5 | 6.5 |
| $K_2O$ | — | 1.4 | — | — | — | — | 1.4 | 1.4 | 1.4 |
| MgO | — | — | — | — | — | — | — | — | — |
| CaO | 1.4 | 1.4 | 1.4 | 1.4 | 1.4 | 1.4 | 1.4 | 1.4 | 1.4 |
| SrO | — | — | — | — | — | — | — | — | — |
| BaO | — | 2.0 | — | — | — | — | 2.0 | 2.0 | 2.0 |
| F | 0.25 | 0.25 | 0.30 | 0.25 | 0.20 | 0.20 | 0.25 | 0.25 | 0.25 |
| $TiO_2$ | — | 4.6 | 0.50 | 1.5 | 4 | 5.5 | 0.5 | 2.0 | 4.0 |
| $Fe_3O_3$ | — | 1.1 | — | — | — | — | — | — | — |
| $MnO_2$ | — | 0.1 | — | — | — | — | — | — | — |
| $As_2O_3$ | 0.05 | — | — | 0.05 | 0.1 | 0.1 | — | — | — |
| Sum | 100 | 100 | 100 | 100 | 100 | 100 | 100 | 100 | 100 |
| τ < 0.1%, nm | 255 | 351 | 263 | 286 | 327 | 349 | 260 | 293 | 324 |
| τ(%) at 400 nm | >80 | 6.7 | >80 | >80 | >80 | >80 | >80 | >80 | >80 |
| Tg [° C.] | 559 | 551 | 558 | 556 | 559 | 556 | 553 | 549 | 550 |
| $V_A$ [° C.] | 1154 | 1163 | 1152 | 1150 | 1151 | 1152 | 1165 | 1167 | 1163 |
| CTE [$10^{-6} \cdot K^{-1}$] | 4.93 | 5.38 | 4.95 | 4.94 | 4.93 | 4.93 | 5.32 | 5.33 | 5.36 |

The reported transmission values are for the not after-cooled sample. When the sample is heated anew during further processing, this can lead to a shift of the entire cutoff in the direction of the visible range and/or to a return of the transmission in the transitional region from the UV to the visible region.

While the invention has been illustrated and described as embodied in a borosilicate glass with UV-blocking properties for pharmaceutical packaging applications, it is not intended to be limited to the details shown, since various modifications and changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and is set forth in the following appended claims.

We claim:

1. A borosilicate glass with UV-blocking properties for pharmaceutical packaging, said borosilicate glass comprising, in wt. % on the basis of oxide content:

| | |
|---|---|
| $SiO_2$ | 60-80 |
| $B_2O_3$ | 8.2-15 |
| $Al_2O_3$ | 2-10 |
| $TiO_2$ | 0.5-7 |
| $\Sigma Li_2O + K_2O + Na_2O$ | 3-10 |
| Σ alkaline earth oxides | 0.5-10 |
| $ZrO_2$ | 0-3 |
| $Fe_2O_3$ | 0-0.2; | and a glass transition temperature Tg of 550° C. to 590° C., a processing temperature $V_A$ of 1100° C. to 1200° C. at a viscosity of $10^4$ Pa s, a transmission π of at least 80% at a wavelength of 400 nm, and a transmission π of less than 0.1% at a wavelength of under 260 nm, each for a sample thickness of 1 mm, and wherein the borosilicate glass is made by melting under oxidizing conditions.

2. The borosilicate glass as defined in claim 1, containing from 0.5 to 5.5 wt. % of $TiO_2$.

3. The borosilicate glass as defined in claim 1, containing from 50 ppm to 1500 ppm of $Fe_2O_3$.

4. The borosilicate glass as defined in claim 1, in which at least 80% of the $TiO_2$ present is in the +4 oxidation state.

5. The borosilicate glass as defined in claim 1, which is refined with $As_2O_3$ and/or $Sb_2O_3$ as refining agent.

6. The borosilicate glass as defined in claim 1, further comprising up to 1 wt. % of F.

7. The borosilicate glass as defined in claim 1, wherein $Fe_2O_3$ is present and a molar ratio of $Fe_2O_3$ to $TiO_2$ is greater than 1/6.

8. The borosilicate glass as defined in claim 1, further comprising from 0 to 3 wt. % of $Bi_2O_3$, 0 to 1 wt. % of $WO_3$, and from 0 to 1 wt. % of $MoO_3$.

9. A borosilicate glass with UV-blocking properties for pharmaceutical packaging, said borosilicate glass comprising in wt. %:

| | |
|---|---|
| $SiO_2$ | 69-77 |
| $B_2O_3$ | 10-12 |
| $Al_2O_3$ | 3.5-6 |
| $TiO_2$ | 0.1-7 |
| $Na_2O$ | 6-8 |
| CaO | 1-2.5 |
| Σ $Li_2O + K_2O + Na_2O$ | 3-10 |
| Σ alkaline earth oxides | 0.5-10 |
| $ZrO_2$ | 0-1 |
| F | 0.20-1 |
| $Fe_2O_3$ | 0-1500 ppm; | and a glass transition temperature Tg of 550° C. to 590° C., a processing temperature $V_A$ of 1100° C. to 1200° C. at a viscosity of $10^4$ Pa s, a transmission π of at least 80% at a wavelength of 400 nm, and a transmission π of less than 0.1% at a wavelength of under 260 nm, each for a sample thickness of 1 mm, and
   wherein the borosilicate glass is made by melting under oxidizing conditions.

10. The borosilicate glass as defined in claim 1, containing, in wt. %:

| | |
|---|---|
| $SiO_2$ | 67-75 |
| $B_2O_3$ | 8.2-10 |
| $Al_2O_3$ | 3-7 |
| $TiO_2$ | 0.5-4.5 |
| $Na_2O$ | 5.5-8 |
| CaO | 0.5-2 |
| BaO | 1-3 |
| $ZrO_2$ | 0-1 |
| F | 0.20-1 |
| $Fe_2O_3$ | 50 ppm-1500 ppm. |

11. A pharmaceutical package for a pharmaceutical preparation, said pharmaceutical package comprising a borosilicate glass with UV-blocking properties for pharmaceutical packaging, said borosilicate glass comprising, in wt. % on the basis of oxide content:

| | |
|---|---|
| $SiO_2$ | 60-80 |
| $B_2O_3$ | 8.2-15 |
| $Al_2O_3$ | 2-10 |
| $TiO_2$ | 0.5-7 |
| Σ $Li_2O + K_2O + Na_2O$ | 3-10 |
| Σ alkaline earth oxides | 0.5-10 |
| $ZrO_2$ | 0-3 |
| $Fe_2O_3$ | 0-0.2; | and a glass transition Tg of 550° C. to 590° C., a processing temperature $V_A$ of 1100° C. to 1200° C. at a viscosity of $10^4$ Pa s, a transmission π of at least 80% at a wavelength of 400 nm, and a transmission π of less than 0.1% at a wavelength of under 260 nm, each for a sample thickness of 1 mm, and
   wherein the borosilicate glass is made by melting under oxidizing conditions.

12. The pharmaceutical package as defined in claim 11, wherein said borosilicate glass contains from 0.5 to 4.5 wt. % of $TiO_2$ and from 50 ppm to 1500 ppm of $Fe_2O_3$.

\* \* \* \* \*